(12) United States Patent
Ohno et al.

(10) Patent No.: US 12,253,360 B2
(45) Date of Patent: Mar. 18, 2025

(54) FIBER OPTIC GYROSCOPE

(71) Applicant: JAPAN AVIATION ELECTRONICS INDUSTRY, LIMITED, Tokyo (JP)

(72) Inventors: Aritaka Ohno, Tokyo (JP); Takashi Nakahara, Tokyo (JP); Taro Miyama, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 177 days.

(21) Appl. No.: 18/138,237

(22) Filed: Apr. 24, 2023

(65) Prior Publication Data

US 2023/0408257 A1     Dec. 21, 2023

(30) Foreign Application Priority Data

Jun. 21, 2022   (JP) .................................. 2022-099606

(51) Int. Cl.
*G01C 19/72*     (2006.01)
(52) U.S. Cl.
CPC ................................. *G01C 19/722* (2013.01)
(58) Field of Classification Search
CPC .... G01C 19/72; G01C 19/721; G01C 19/722; G01C 19/727
See application file for complete search history.

(56) References Cited

U.S. PATENT DOCUMENTS

| 5,187,757 | A | * | 2/1993 | Ohno | G01C 19/721 |
|---|---|---|---|---|---|
| | | | | | 385/11 |
| 2007/0030491 | A1 | * | 2/2007 | Ohno | G01C 19/721 |
| | | | | | 356/460 |
| 2015/0022818 | A1 | * | 1/2015 | Lloyd | G01C 19/721 |
| | | | | | 356/460 |
| 2016/0153782 | A1 | * | 6/2016 | Voigt | G02B 6/024 |
| | | | | | 385/11 |

FOREIGN PATENT DOCUMENTS

| CN | 110455270 B | * | 7/2022 | ........... G01C 19/721 |
|---|---|---|---|---|
| JP | 2004-309466 A | | 11/2004 | |

* cited by examiner

*Primary Examiner* — Michael A Lyons
(74) *Attorney, Agent, or Firm* — Greenblum & Bernstein, P.L.C.

(57) ABSTRACT

Totally six polarization-maintaining optical fibers having the same beat length are arranged at both ends of a single-mode optical fiber and both ends of a single-mode optical fiber coil, respectively. An angle between a principal axis of polarization in a first polarization-maintaining optical fiber and a plane of polarization of linearly polarized light from a light source is 45 degrees. The optical length of each of the six polarization-maintaining optical fibers is larger than a coherent length of the linearly polarized light from the light source. The total of the optical lengths of the six polarization-maintaining optical fibers into which polarization rotation in the process of passing through the single-mode optical fibers is factored is larger than the coherent length of the linearly polarized light from the light source.

2 Claims, 1 Drawing Sheet

FIBER OPTIC GYROSCOPE

TECHNICAL FIELD

The present disclosure relates to a fiber optic gyroscope and, more particularly, to depolarization (i.e., artificial creation of a depolarized state) of light to be used in a fiber optic gyroscope.

BACKGROUND ART

For example, Japanese Patent Application Laid-Open No. 2004-309466 (hereinafter referred to as Patent Literature 1) is known as a prior art for depolarization of light to be used in a fiber optic gyroscope. An optical system of a fiber optic gyroscope 900 disclosed in Patent Literature 1 comprises the following basic components:

a) a light source 11;
b) an optical element 13 (for example, an optical crystal of lithium niobate ($LiNbO_3$)) in which a Y-shaped optical waveguide 13a is formed;
c) a single-mode optical fiber coil 15;
d) a single-mode optical fiber 16;
e) a second polarization-maintaining optical fiber 22;
f) a third polarization-maintaining optical fiber 23;
g) a fourth polarization-maintaining optical fiber 24;
h) a fifth polarization-maintaining optical fiber 25; and
i) a sixth polarization-maintaining optical fiber 26. For convenience of description, the first of the ordinal numbers is designated as "second".

The connecting relation of these components is as follows:

1) one end of the single-mode optical fiber 16 is connected to the light source 11;
2) one end of the second polarization-maintaining optical fiber 22 is connected to the other end of the single-mode optical fiber 16 (in the figures, in order to facilitate distinction, line widths of polarization-maintaining optical fibers are illustrated to be larger than those of the single-mode optical fibers);
3) a first end of the Y-shaped optical waveguide 13a is connected to the other end of the second polarization-maintaining optical fiber 22;
4) one end of the third polarization-maintaining optical fiber 23 is connected to a second end of the Y-shaped optical waveguide 13a;
5) one end of the fourth polarization-maintaining optical fiber 24 is connected to the other end of the third polarization-maintaining optical fiber 23 (in the figures, the boundary between the third polarization-maintaining optical fiber 23 and the fourth polarization-maintaining optical fiber 24 is illustrated with a dashed line);
6) one end of the single-mode optical fiber coil 15 is connected to the other end of the fourth polarization-maintaining optical fiber 24;
7) one end of the fifth polarization-maintaining optical fiber 25 is connected to the other end of the single-mode optical fiber coil 15;
8) one end of the sixth polarization-maintaining optical fiber 26 is connected to the other end of the fifth polarization-maintaining optical fiber 25 (in the figures, the boundary between the fifth polarization-maintaining optical fiber and the sixth polarization-maintaining optical fiber 26 is illustrated with a dashed line); and
9) a third end of the Y-shaped optical waveguide 13a is connected to the other end of the sixth polarization-maintaining optical fiber 26.

Furthermore, regarding the principal axes of the polarization-maintaining optical fibers, A) the angle between the principal axis of polarization in the third polarization-maintaining optical fiber 23 and the principal axis of polarization in the fourth polarization-maintaining optical fiber 24 is 45 degrees;
B) the angle between the principal axis of polarization in the fifth polarization-maintaining optical fiber 25 and the principal axis of polarization in the sixth polarization-maintaining optical fiber 26 is 45 degrees;
C) the principal axis of polarization in the second polarization-maintaining optical fiber 22 is matched with the direction of electric field of the TE mode (Transverse Electric mode) in the Y-shaped optical waveguide 13a;
D) the principal axis of polarization in the third polarization-maintaining optical fiber 23 is matched with the direction of electric field of the TE mode in the Y-shaped optical waveguide 13a; and
E) The principal axis of polarization in the sixth polarization-maintaining optical fiber 26 is matched with the direction of electric field of the TE mode in the Y-shaped optical waveguide 13a.

Further, the second polarization-maintaining optical fiber 22, the third polarization-maintaining optical fiber 23, the fourth polarization-maintaining optical fiber 24, the fifth polarization-maintaining optical fiber 25, and the sixth polarization-maintaining optical fiber 26 have the same beat length. When $L_b$ is the beat length, X is the wavelength of light from the light source 11, $L_c$ is the coherent length of the light from the light source 11, and L is the length of a polarization-maintaining optical fiber for giving a group delay longer than $L_c$ between two linearly polarized light beams crossing orthogonally, the length $L_2$ of the second polarization-maintaining optical fiber 22, the length $L_3$ of the third polarization-maintaining optical fiber 23, the length $L_4$ of the fourth polarization-maintaining optical fiber 24, the length $L_5$ of the fifth polarization-maintaining optical fiber 25, and the length $L_6$ of the sixth polarization-maintaining optical fiber 26 satisfy the following formulas:

$$L_2 \geq L,\ L_4 \geq L,\ L_5 \geq L,$$

$$|L_2 + L_3 - L_4| \geq L,$$

$$|L_2 + L_6 - L_5| \geq L,$$

$$||L_2 + L_3 - L_4| - |L_2 + L_6 - L_5|| \geq L.$$

Regarding these technical features, see claim 1 and FIG. 4 of Patent Literature 1. The symbol |x| represents the absolute value of the real number x.

The optical element 13 comprises, in practice, a phase modulator for phase-modulating each of CW (clockwise) light traveling clockwise through the single-mode optical fiber coil 15 and CCW (counter-clockwise) light traveling counter-clockwise through the single-mode optical fiber coil 15. However, since the phase modulator is not directly related to the present invention and the configuration and function thereof are well known, the illustration and description thereof are omitted. Furthermore, the fiber optic gyroscope 900 comprises, in practice, an optical coupler attached to the single-mode optical fiber 16 to extract interference light in which CW light and CCW light are optically coupled to each other, a photoelectric converter for photoelectrically converting light from the optical coupler, a signal processing circuit for performing signal processing such as angular velocity detection, etc. on the basis of an electrical signal from the photoelectric converter, and the like. However, since these components are not directly related to the present invention and the configurations and functions thereof are well known, the illustration and description thereof are omitted.

According to Patent Literature 1, most of the optical system can be configured with inexpensive single-mode optical fibers, and unpolarized light can propagate through the single-mode optical fiber coil.

When a depolarizer is configured using polarization-maintaining optical fibers, it is preferable in the fiber optic gyroscope 900 to use a light source which has a high optical coupling efficiency with the single-mode optical fiber 16, a high power density, and a broadband optical spectrum, and emits light having low temporal coherence. For example, a superluminescent diode (SLD) is used as such a light source 11. Light from the SLD has polarization properties. Regarding light from the light source 11, in the case where the polarization extinction ratio of two linearly polarized light beams crossing orthogonally each other is, for example, about 0 to 3 dB at maximum, even though polarization rotation of the two linearly polarized light beams occurs in the process during which the two linearly polarized light beams is passing through the single-mode optical fiber 16, there is no significant difference in light intensity between the two linearly polarized light beams which have entered the optical element 13. Therefore, even though the optical element 13 as a polarizer allows one of the two linearly polarized light beams to pass therethrough, there is no large fluctuation in the amount of light.

However, with enhancement in performance of semiconductor light-emitting devices, the polarization extinction ratio of two orthogonally-crossing linearly polarized light beams which are light from the light source 11 has recently increased to, for example, about 10 to 18 dB. When polarization rotation of the light from the light source 11 occurs in the process during which the light from the light source 11 having such polarization properties passes through the single-mode optical fiber 16, there is a possibility that the amount of light greatly fluctuates due to the optical element 13 as a polarizer mainly making linearly polarized light having a remarkably small light intensity pass therethrough. In other words, the amount of light passing through the single-mode optical fiber coil 15 is greatly reduced, so that the signal-to-noise ratio gets worse and the performance of the fiber optic gyroscope 900 deteriorates.

A simple example of solving such a technical problem is to connect the light source 11 and the first end of the Y-shaped optical waveguide 13a to each other through a polarization-maintaining optical fiber. However, it is preferable to avoid such a solution from the point of view of the connection with an optical coupler and the cost.

BRIEF SUMMARY OF THE INVENTION

In view of the above technical problem, a fiber optic gyroscope is provided which can stabilize the amount of light passing through a single-mode optical fiber coil.

Technical matters described herein are neither provided to limit the claimed invention expressly or implicitly, nor provided to enable anyone other than persons who would benefit from the invention (e.g., the applicant and the right holder) to limit the claimed invention, but provided merely to facilitate understanding of the gist of the invention. The general outline of the present invention described from other aspects can be understood from, for example, the claims of the present application as originally filed at the time of application.

A fiber optic gyroscope disclosed in the present specification comprises one additional polarization-maintaining optical fiber in addition to the five polarization-maintaining optical fibers described above.

Each of the totally six polarization-maintaining optical fibers has the same beat length.

The light source and one end of the single-mode optical fiber are connected to each other with the one additional polarization-maintaining optical fiber.

The angle between the principal axis of polarization of the one additional polarization-maintaining optical fiber and the plane of polarization of linearly polarized light from the light source is 45 degrees.

The optical length of each of the totally six polarization-maintaining optical fibers is larger than the coherent length of the linearly polarized light from the light source. In other words, when $L_c$ is the coherent length of the linearly polarized light, $L_i$ is the physical length of the i-th polarization-maintaining optical fiber, and n is the birefringence of the polarization-maintaining optical fiber, $L_i \times n > L_c$.

The total of the optical lengths of the totally six polarization-maintaining optical fibers into which the polarization rotation in the process of passing through the single-mode optical fiber is factored is larger than the coherent length of the linearly polarized light from the light source. Embodiments described later should be referred to for details.

Effects of the Invention

The fiber optic gyroscope disclosed in this specification can stabilize the amount of light passing through the single-mode optical fiber coil.

LIST OF REFERENCE NUMERALS

Figure 1:
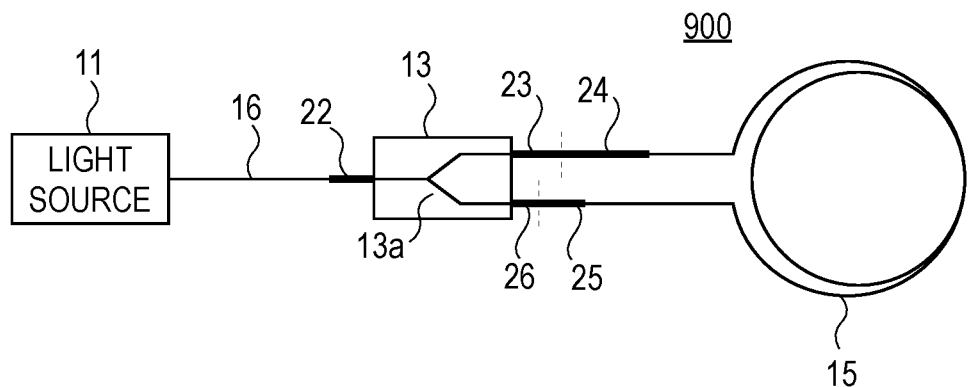
FIG. 1 shows an optical configuration of a fiber optic gyroscope of a prior art.
Figure 2:
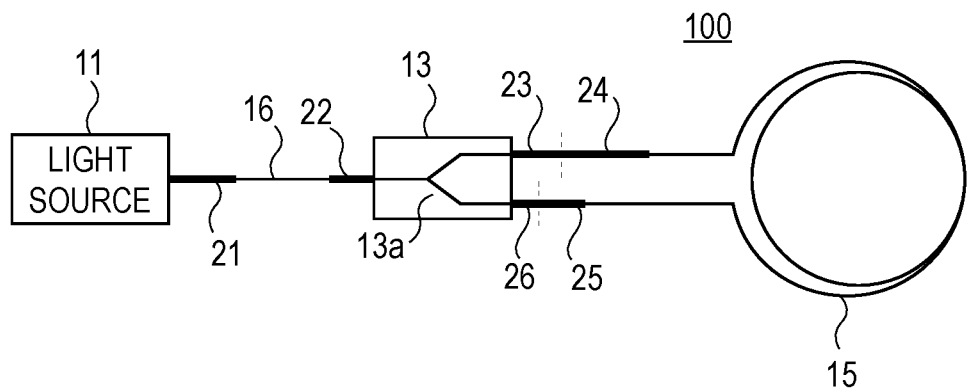
FIG. 2 shows an optical configuration of a fiber optic gyroscope of an embodiment.

11 Light source
13 Optical element
13a Y-shaped optical waveguide
15 Single-mode optical fiber coil
16 Single-mode optical fiber
21 First polarization-maintaining optical fiber
22 Second polarization-maintaining optical fiber
23 Third polarization-maintaining optical fiber
24 Fourth polarization-maintaining optical fiber
25 Fifth polarization-maintaining optical fiber
26 Sixth polarization-maintaining optical fiber
100 Fiber optic gyroscope
900 Fiber optic gyroscope

DETAILED DESCRIPTION

An optical configuration of a fiber optic gyroscope 100 of an embodiment will be described with reference to the drawings. The fiber optic gyroscope 100 comprises, in practice, a phase modulator for phase-modulating each of CW light and CCW light, an optical coupler attached to a single-mode optical fiber in order to extract interference light in which the CW light and the CCW light are optically coupled to each other, a photoelectric converter for photo-electrically converting light from the optical coupler, a signal processing circuit for performing signal processing such as angular velocity detection on the basis of an electrical signal from the photoelectric converter, and the like. However, since these components are not directly related to the present invention and the configurations and functions thereof are well known, illustration and description thereof will be omitted.

The optical system of the fiber optic gyroscope 100 comprises the following basic components:
- a) a light source 11 for emitting linearly polarized light;
- b) a single-mode optical fiber 16 having one end and another end;
- c) a first polarization-maintaining optical fiber 21 having one end and another end;
- d) a second polarization-maintaining optical fiber 22 having one end and another end;
- e) a third polarization-maintaining optical fiber 23 having one end and another end;
- f) a fourth polarization-maintaining optical fiber 24 having one end and another end;
- g) a fifth polarization-maintaining optical fiber 25 having one end and another end;
- h) a sixth polarization-maintaining optical fiber 26 having one end and another end;
- i) a single-mode optical fiber coil 15 having one end and another end; and
- j) an optical element 13 including a Y-shaped optical waveguide 13a, the Y-shaped optical waveguide 13a having a first end, a second end and a third end. The optical element 13 is, for example, an optical crystal of lithium niobate, and the Y-shaped optical waveguide 13a is, for example, a proton-exchanged LiNbO$_3$ optical waveguide. The proton-exchanged LiNbO$_3$ optical waveguide has a large polarization extinction ratio and functions as an excellent polarizer.

The connecting relation of these components is as follows:
1) the one end of the first polarization-maintaining optical fiber 21 is connected to the light source 11 (in the figures, in order to facilitate distinction, line widths of a polarization-maintaining optical fibers are illustrated as being larger than those of the single-mode optical fibers);
2) the one end of the single-mode optical fiber 16 is connected to said another end of the first polarization-maintaining optical fiber 21;
3) the one end of the second polarization-maintaining optical fiber 22 is connected to said another end of the single-mode optical fiber 16;
4) the first end of the Y-shaped optical waveguide 13a is connected to said another end of the second polarization-maintaining optical fiber 22;
5) the one end of the third polarization-maintaining optical fiber 23 is connected to the second end of the Y-shaped optical waveguide 13a;
6) the one end of the fourth polarization-maintaining optical fiber 24 is connected to said another end of the third polarization-maintaining optical fiber 23 (in the figures, the boundary between the third polarization-maintaining optical fiber 23 and the fourth polarization-maintaining optical fiber 24 is indicated with a dashed line),
7) the one end of the single-mode optical fiber coil 15 is connected to said another end of the fourth polarization-maintaining optical fiber 24;
8) the one end of the fifth polarization-maintaining optical fiber 25 is connected to said another end of the single-mode optical fiber coil 15;
9) the one end of the sixth polarization-maintaining optical fiber 26 is connected to said another end of the fifth polarization-maintaining optical fiber 25 (in the figures, the boundary between the fifth polarization-maintaining optical fiber 25 and the sixth polarization-maintaining optical fiber 26 is indicated with a dashed line); and
10) the third end of the Y-shaped optical waveguide 13a is connected to said another end of the sixth polarization-maintaining optical fiber 26.

It goes without saying that the axial center of the first polarization-maintaining optical fiber 21, the axial center of the second polarization-maintaining optical fiber 22, and the axial center of the single-mode optical fiber 16 are aligned with one another, and the axial center of the third polarization-maintaining optical fiber 23, the axial center of the fourth polarization-maintaining optical fiber 24, the axial center of the fifth polarization-maintaining optical fiber 25, the axial center of the sixth polarization-maintaining optical fiber 26, and the axial center of the single-mode optical fiber coil 15 are aligned with one another.

Furthermore, regarding the principal axes of the polarization-maintaining optical fibers,
- A) the angle between the principal axis of polarization in the first polarization-maintaining optical fiber 21 and the plane of polarization of the linearly polarized light from the light source 11 is 45 degrees;
- B) the angle between the principal axis of polarization in the third polarization-maintaining optical fiber 23 and the principal axis of polarization in the fourth polarization-maintaining optical fiber 24 is 45 degrees;
- C) the angle between the principal axis of polarization in the fifth polarization-maintaining optical fiber 25 and the principal axis of polarization in the sixth polarization-maintaining optical fiber 26 is 45 degrees;
- D) the principal axis of polarization in the second polarization-maintaining optical fiber 22 is matched with the direction of electric field of the IE mode in the Y-shaped optical waveguide 13a;
- E) the principal axis of polarization in the third polarization-maintaining optical fiber 23 is matched with the direction of electric field of the TE mode in the Y-shaped optical waveguide 13a; and
- F) the principal axis of polarization in the sixth polarization-maintaining optical fiber 26 is matched with the direction of electric field of the TE mode in the Y-shaped optical waveguide 13a.

Each of the above conditions A), B), and C) is for making incident light split with equal intensity into two polarization modes which are orthogonal to each other, that is, a polarization mode of a fast axis of the polarization-maintaining optical fiber and a polarization mode of a slow axis of the polarization-maintaining optical fiber. Each of the above conditions D), E), and F) is for making the polarization mode of, for example, the fast axis in the polarization-maintaining optical fiber match with the TE mode in the Y-shaped optical waveguide 13a.

Furthermore, the optical length of each of the first polarization-maintaining optical fiber 21, the second polarization-maintaining optical fiber 22, the third polarization-maintaining optical fiber 23, the fourth polarization-maintaining optical fiber 24, the fifth polarization-maintaining optical fiber 25, and the sixth polarization-maintaining optical fiber 26 is larger than the coherent length of the linearly polarized light from the light source 11. In other words, when the first polarization-maintaining optical fiber 21, the second polarization-maintaining optical fiber 22, the third polarization-maintaining optical fiber 23, the fourth polarization-maintaining optical fiber 24, the fifth polarization-maintaining optical fiber 25, and the sixth polarization-maintaining optical fiber 26 each have the same birefringence n, $L_c$ is the coherent length of the linearly polarized light from the light source 11, L 1 is the physical length of the first polarization-maintaining optical fiber 21, $L_2$ is the physical length of the second polarization-maintaining optical fiber 22, $L_3$ is the physical length of the third polarization-maintaining optical fiber 23, $L_4$ is the physical length of the fourth polarization-maintaining optical fiber 24, $L_5$ is the physical length of the fifth polarization-maintaining optical fiber 25, and $L_6$ is the physical length of the sixth polarization-maintaining optical fiber 26, the following formulas are satisfied:

$$L_1 \times n > L_c; \quad \alpha)$$

$$L_2 \times n > L_c; \quad \beta)$$

$$L_3 \times n > L_c; \quad \gamma)$$

$$L_4 \times n > L_c; \quad \delta)$$

$$L_5 \times n > L_c; \text{ and} \quad \varepsilon)$$

$$L_6 \times n > L_c. \quad \zeta)$$

These formulas correspond to a condition under which a group delay difference is given between two orthogonal polarization modes due to passage of the two orthogonal polarization modes through the polarization-maintaining optical fiber, so that the two orthogonal polarization modes cannot interfere with each other. In short, each of the first polarization-maintaining optical fiber 21, the second polarization-maintaining optical fiber 22, the third polarization-maintaining optical fiber 23, the fourth polarization-maintaining optical fiber 24, the fifth polarization-maintaining optical fiber 25, and the sixth polarization-maintaining optical fiber 26 is required to have a physical length larger than Lin.

In general, when $L_b$ is the beat length of the polarization-maintaining optical fiber and λ is the wavelength of the linearly polarized light from the light source 11, $n=\lambda/L_b$ holds. Therefore, the above conditions may be respectively rewritten as follows:

$$L_1 \times \lambda/L_b > L_c; \quad \alpha)$$

$$L_2 \times \lambda/L_b > L_c; \quad \beta)$$

$$L_3 \times \lambda/L_b > L_c; \quad \gamma)$$

$$L_4 \times \lambda/L_b > L_c; \quad \delta)$$

$$L_5 \times \lambda/L_b > L_c; \text{ and} \quad \varepsilon)$$

$$L_6 \times \lambda/L_b > L_c. \quad \zeta)$$

According to the condition A) and the condition α), linearly polarized light from the light source 11 is split with equal intensity into the fast-axis polarization mode and the slow-axis polarization mode in the first polarization-maintaining optical fiber 21, and the correlation between the fast-axis polarization mode and the slow-axis polarization mode in the propagation process is lost, so that an unpolarized state of light is obtained by the first polarization-maintaining optical fiber 21. In other words, the first polarization-maintaining optical fiber 21 depolarizes the linearly polarized light from the light source 11 (specifically, the first polarization-maintaining optical fiber 21 converts the linearly polarized light from the light source 11 into two orthogonal polarization modes which have equal intensity and are uncorrelated to each other).

The second polarization-maintaining optical fiber 22 preserves, according to the condition β), the unpolarized state obtained by the first polarization-maintaining optical fiber 21, but according to the condition D) the fast-axis polarization mode in the second polarization-maintaining optical fiber 22 travels through the Y-shaped optical waveguide 13a in the IE waveguide mode.

The Y-shaped optical waveguide 13a splits light with equal intensity.

One light of the TE waveguide mode (that is, CW light) from the Y-shaped optical waveguide 13a enters, according to condition E), the fast axis in the third polarization-maintaining optical fiber 23, but according to condition γ) the third polarization-maintaining optical fiber 23 converts the light of the TE waveguide mode from the Y-shaped optical waveguide 13a into two polarization modes which are uncorrelated and orthogonal to each other.

According to the condition B) and the condition δ), the fourth polarization-maintaining optical fiber 24 depolarizes the light obtained by the third polarization-maintaining optical fiber 23 (specifically, the fourth polarization-maintaining optical fiber 24 converts the light obtained by the third polarization-maintaining optical fiber 23 into two orthogonal polarization modes which has equal intensity and are uncorrelated to each other).

According to the condition s), the fifth polarization-maintaining optical fiber 25 preserves the unpolarized state of the light from the fourth polarization-maintaining optical fiber 24 that propagated through the single-mode optical fiber coil 15.

The sixth polarization-maintaining optical fiber 26 preserves, according to the condition C) and the condition ζ), the unpolarized state of the light from the fifth polarization-maintaining optical fiber 25, but according to the condition F) the fast-axis polarization mode in the sixth polarization-maintaining optical fiber 26 travels through the Y-shaped optical waveguide 13a in the TE waveguide mode.

The other light of the TE waveguide mode (that is, CCW light) from the Y-shaped optical waveguide 13a enters, according to the condition F), the fast axis in the sixth polarization-maintaining optical fiber 26, but according to the condition ζ) the sixth polarization-maintaining optical fiber 26 converts the light of the TE waveguide mode from the Y-shaped optical waveguide 13a into two polarization modes which are uncorrelated and orthogonal to each other.

According to the condition C) and the condition s), the fifth polarization-maintaining optical fiber 25 depolarizes the light obtained by the sixth polarization-maintaining optical fiber 26 (specifically, the fifth polarization-maintaining optical fiber 25 converts the light obtained by the sixth polarization-maintaining optical fiber 26 into two orthogonal polarization modes which have equal intensity and are uncorrelated to each other).

According to the condition δ), the fourth polarization-maintaining optical fiber 24 preserves the unpolarized state of the light from the fifth polarization-maintaining optical fiber 25 that propagated through the single-mode optical fiber coil 15.

The third polarization-maintaining optical fiber 23 preserves, according to the condition B) and the condition γ), the unpolarized state of the light from the fourth polarization-maintaining optical fiber 24, but according to the condition E) the fast-axis polarization mode in the third polarization-maintaining optical fiber 23 travels through the Y-shaped optical waveguide 13$a$ in the TE waveguide mode.

The single-mode optical fiber can generally transmit light of any polarization state therethrough, and the polarization state of the light inside the single-mode optical fiber is easily changed due to, for example, environmental disturbance of the single-mode optical fiber. In other words, polarization rotation of two orthogonal polarization modes may occur in the process of passing through a single-mode optical fiber. Furthermore, though the optical element 13 is an excellent polarizer and does not cause polarization rotation, the optical element 13 is not a perfect polarizer with an infinite polarization extinction ratio. Thus, the optical element 13 cannot perfectly select only one of the two orthogonal polarization modes. Moreover, as already mentioned, the unpolarized state of light is generated by each polarization-maintaining optical fiber, but this state is an artificially generated unpolarized state unlike the unpolarized state of natural light. Accordingly, when the polarization rotation of two orthogonal polarization modes occurs in the process of passing through the single-mode optical fiber, the correlation between the two orthogonal polarization modes may revive after the orthogonal polarization modes pass through two or more of polarization-maintaining optical fibers. The reason for this is as follows. When the fast-axis polarization mode and the slow-axis polarization mode, between which a group delay difference corresponding to the optical length of a polarization-maintaining optical fiber on a former stage is given by the polarization-maintaining optical fiber on the former stage, enter respectively the slow-axis and the fast-axis of a polarization-maintaining optical fiber on a latter stage due to the polarization rotation of 90 degrees by a single-mode optical fiber, the group delay difference obtained according to the optical length of the polarization-maintaining optical fiber on the former stage is reduced according to the optical length of the polarization-maintaining optical fiber on the latter stage. In other words, even when all of the conditions $\alpha$), $\beta$), $\gamma$), $\delta$), $\varepsilon$), and $\zeta$) are satisfied, the correlation of the two orthogonal polarization modes may revive for each of the CW light and CCW light entering the optical element 13. Accordingly, a condition for eliminating such a possibility is required for the CW light and CCW light entering the optical element 13.

This condition is as follows: "The total of the optical lengths of total six polarization-maintaining optical fibers into which the polarization rotation(s) in the process of passing through the single-mode optical fiber 16 and the single-mode optical fiber coil 15 is factored is larger than the coherent length of linearly polarized light from the light source." Specifically, I) regarding a case where polarization rotation of 90 degrees occurs in the process of passing through the single-mode optical fiber 16 and polarization rotation of 90 degrees occurs in the process of passing through the single-mode optical fiber coil 15, satisfaction of the condition of $|L_1-(L_2+L_3+L_4)-(L_5+L_6)| \times n > L_c$ can exclude the possibility that the correlation of the two orthogonal polarization modes revives, II) regarding a case where polarization rotation of 90 degrees occurs in the process of passing through the single-mode optical fiber 16 and polarization rotation of 90 degrees does not occur in the process of passing through the single-mode optical fiber coil 15, satisfaction of the condition of $|L_1-(L_2+L_3+L_4)+(L_5+L_6)| \times n > L_c$ can exclude the possibility that the correlation of the two orthogonal polarization modes revives, and III) regarding a case where polarization rotation of 90 degrees does not occur in the process of passing through the single-mode optical fiber 16 and polarization rotation of 90 degrees occurs in the process of passing through the single-mode optical fiber coil 15, satisfaction of the condition of $|L_1+(L_2+L_3+L_4)-(L_5+L_6)| \times n > L_c$ can exclude the possibility that the correlation of the two orthogonal polarization modes revives.

Note that the conditions of I), II) and III) may be rewritten respectively to:

$$|L_1-(L_2+L_3+L_4)-(L_5+L_6)| \times \lambda / L_b > L_c;$$

$$|L_1-(L_2+L_3+L_4)+(L_5+L_6)| \times \lambda / L_b > L_c; \text{ and}$$

$$|L_1+(L_2+L_3+L_4)-(L_5+L_6)| \times \lambda / L_b > L_c.$$

Therefore, in the fiber optic gyroscope 100, even when the polarization extinction ratio of the two orthogonally-crossing linearly polarized light beams from the light source 11 is large, the CW light and the CCW light interfere with each other at the branch point of the Y-shaped optical waveguide 13$a$ with the same intensity and without fluctuation in light amount.

From the viewpoint of cost, it is preferable to choose, from among sets each consisting of six elements of the length $L_1$, the length $L_2$, the length $L_3$, the length $L_4$, the length $L_5$, and the length $L_6$ which satisfy the above conditions $\alpha$), $\beta$), $\gamma$), $\delta$), $\varepsilon$), $\zeta$), I), II), and III), a set having a minimum total of the length $L_1$, the length $L_2$, the length $L_3$, the length $L_4$, the length $L_5$, and the length $L_6$.

SUPPLEMENT

While the invention has been described with reference to exemplary embodiments, it would be understood by those skilled in the art that various changes may be made and equivalents may be substituted for the elements thereof without departing from the scope of the invention. In addition, many modifications may be made to adapt a particular system, device, or component thereof to the teachings of the invention without departing from the essential scope thereof. Therefore, it is intended that the invention not be limited to the particular embodiments disclosed for carrying out the invention, but that the invention will include all embodiments falling within the scope of the appended claims.

Moreover, the use of terms "first", "second" and the like, if any, does not denote any order or importance, but rather the terms "first", "second" and the like are used to distinguish one element from another. The terminology used in the present specification is for the purpose of describing particular embodiments only and is not intend to limit the invention in any way. The term "comprising" and its conjugations, when used in the present specification and/or the appended claims, specify the presence of stated features, steps, operations, elements, and/or components, but do not preclude the presence or addition of one or more other features, steps, operations, elements, components, and/or groups thereof. The term "and/or", if any, includes any and all combinations of one or more of the associated listed elements. In the claims and the specification, unless otherwise noted, the terms "connect", "couple", "join", "link", or synonyms therefor and all the word forms thereof, if any, do not necessarily deny the presence of one or more intermediate elements between two elements, for instance, two elements "connected" or "coupled" to each other or "linked" to each other. In the claims and the specification, the term "any", if written, is to be understood as a term that is synonymous with the universal symbol ∀ unless otherwise noted. For example, the phrase of "for any X" has the same meaning as "for all X" or "for each X".

Unless otherwise defined, all terms (including technical and scientific terms) used in the present specification have the same meanings as commonly understood by those skilled in the art to which the invention belongs. Moreover, terms, such as those defined in commonly used dictionaries, should be interpreted as having a meaning that is consistent with their meaning in the context of the relevant art and the present disclosure, and should not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual techniques or steps in an unnecessary fashion. Nevertheless, the present specification and claims should be read with the understanding that such combinations are entirely within the scope of the invention and the claims.

The corresponding structures, materials, actions, and equivalents of all means or step plus function elements in the claims below, if any, are intended to include any structure, material, or act for performing the function in combination with other claimed elements as specifically claimed.

The foregoing description of the embodiments of the invention has been presented for the purpose of illustration and description. It is not intended to be exhaustive and to limit the invention to the precise form disclosed. Modifications or variations are possible in light of the above teaching. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A fiber optic gyroscope comprising:
a light source for emitting linearly polarized light;
a single-mode optical fiber having one end and another end;
a first polarization-maintaining optical fiber having one end and another end;
a second polarization-maintaining optical fiber having one end and another end;
a third polarization-maintaining optical fiber having one end and another end;
a fourth polarization-maintaining optical fiber having one end and another end;
a fifth polarization-maintaining optical fiber having one end and another end;
a sixth polarization-maintaining optical fiber having one end and another end;
a single-mode optical fiber coil having one end and another end; and
an optical element including a Y-shaped optical waveguide, the Y-shaped optical waveguide having a first end, a second end and a third end, wherein
the one end of the first polarization-maintaining optical fiber is connected to the light source,
the one end of the single-mode optical fiber is connected to said another end of the first polarization-maintaining optical fiber,
the one end of the second polarization-maintaining optical fiber is connected to said another end of the single-mode optical fiber;
the first end of the Y-shaped optical waveguide is connected to said another end of the second polarization-maintaining optical fiber,
the one end of the third polarization-maintaining optical fiber is connected to the second end of the Y-shaped optical waveguide,
the one end of the fourth polarization-maintaining optical fiber is connected to said another end of the third polarization-maintaining optical fiber,
the one end of the single-mode optical fiber coil is connected to said another end of the fourth polarization-maintaining optical fiber,
the one end of the fifth polarization-maintaining optical fiber is connected to said another end of the single-mode optical fiber coil,
the one end of the sixth polarization-maintaining optical fiber is connected to said another end of the fifth polarization-maintaining optical fiber, and
the third end of the Y-shaped optical waveguide is connected to said another end of the sixth polarization-maintaining optical fiber,
an angle between a principal axis of polarization in the first polarization-maintaining optical fiber and a plane of polarization of the linearly polarized light is 45 degrees,
an angle between a principal axis of polarization in the third polarization-maintaining optical fiber and a principal axis of polarization in the fourth polarization-maintaining optical fiber is 45 degrees,
an angle between a principal axis of polarization in the fifth polarization-maintaining optical fiber and a principal axis of polarization in the sixth polarization-maintaining optical fiber is 45 degrees,
a principal axis of polarization in the second polarization-maintaining optical fiber is matched with a direction of electric field of a TE mode in the Y-shaped optical waveguide,
the principal axis of polarization in the third polarization-maintaining optical fiber is matched with the direction of electric field of the TE mode in the Y-shaped optical waveguide, and
the principal axis of polarization in the sixth polarization-maintaining optical fiber is matched with the direction of electric field of the TE mode in the Y-shaped optical waveguide,
the first polarization-maintaining optical fiber, the second polarization-maintaining optical fiber, the third polarization-maintaining optical fiber, the fourth polarization-maintaining optical fiber, the fifth polarization-maintaining optical fiber, and the sixth polarization-maintaining optical fiber have the same beat length, and $$L_s \times \lambda/L_b > L_c,$$

$$|L_1-(L_2+L_3+L_4)-(L_5+L_6)| \times \lambda/L_b > L_c,$$

$$|L_1-(L_2+L_3+L_4)+(L_5+L_6)| \times \lambda/L_b > L_c, \text{ and}$$

$$|L_1+(L_2+L_3+L_4)-(L_5+L_6)| \times \lambda/L_b > L_c$$

are satisfied, where $L_b$ is the beat length, $\lambda$ is a wavelength of the linearly polarized light, $L_c$ is a coherent length of the linearly polarized light, and $L_s$ is a smallest value out of a length $L_1$ of the first polarization-maintaining optical fiber, a length $L_2$ of the second polarization-maintaining optical fiber, a length $L_3$ of the third polarization-maintaining optical fiber, a length $L_4$ of the fourth polarization-maintaining optical fiber, a length $L_5$ of the fifth polarization-maintaining optical fiber, and a length $L_6$ of the sixth polarization-maintaining optical fiber.

2. The fiber optic gyroscope according to claim 1, wherein the length $L_1$, the length $L_2$, the length $L_3$, the length $L_4$, the length $L_5$, and the length $L_6$ are such that a total of the length $L_1$, the length $L_2$, the length $L_3$, the length $L_4$, the length $L_5$, and the length $L_6$ is minimum, in sets each consisting of the length $L_1$, the length $L_2$, the length $L_3$, the length $L_4$, the length $L_5$, and the length $L_6$ satisfying $L_s \times \lambda / L_b > L_c$, $|L_1 - (L_2 + L_3 + L_4) - (L_5 + L_6)| \times \lambda / L_b > L_c$, $|L_1 - (L_2 + L_3 + L_4) + (L_5 + L_6)| \times \lambda / L_b > L_c$, and $|L_1 + (L_2 + L_3 + L_4) - (L_5 + L_6)| \times \lambda / L_b > L_c$.

* * * * *